United States Patent
Xu et al.

(10) Patent No.: US 8,659,345 B2
(45) Date of Patent: Feb. 25, 2014

(54) SWITCH LEVEL CIRCUIT WITH DEAD TIME SELF-ADAPTING CONTROL

(75) Inventors: Shen Xu, Nanjing (CN); Weifeng Sun, Nanjing (CN); Miao Yang, Nanjing (CN); Sichao Liu, Nanjing (CN); Youshan Jin, Nanjing (CN); Shengli Lu, Nanjing (CN); Longxing Shi, Nanjing (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 13/515,801

(22) PCT Filed: Oct. 26, 2010

(86) PCT No.: PCT/CN2010/078103
§ 371 (c)(1),
(2), (4) Date: Jun. 13, 2012

(87) PCT Pub. No.: WO2012/016401
PCT Pub. Date: Feb. 9, 2012

(65) Prior Publication Data
US 2012/0256671 A1 Oct. 11, 2012

(30) Foreign Application Priority Data
Aug. 6, 2010 (CN) .......................... 2010 1 0248404

(51) Int. Cl.
*H03K 17/687* (2006.01)
(52) U.S. Cl.
USPC ............ 327/427; 327/434; 327/436; 327/437
(58) Field of Classification Search
USPC ................... 327/427, 434, 436, 437; 323/282
See application file for complete search history.

(56) References Cited

U.S. PATENT DOCUMENTS 6,020,729 A * 2/2000 Stratakos et al. ............. 323/283
7,265,523 B2 * 9/2007 Dowlatabadi ................. 323/222
(Continued)

FOREIGN PATENT DOCUMENTS

CN 2554861 Y 6/2003
CN 101345474 A 1/2009
(Continued)

OTHER PUBLICATIONS

International Search Report corresponding to PCT/CN2010/078103, dated May 5, 2011, 6 pages.

*Primary Examiner* — Kenneth B. Wells
(74) *Attorney, Agent, or Firm* — Christie, Parker & Hale, LLP

(57) ABSTRACT

A switch level circuit (110) with dead time self-adapting control, which minimizes the switching loss in a switching power supply converter with synchronous rectification by changing a dead time between a high-side control transistor (10) and a low-side synchronous rectifying transistor (11). The switch level circuit (110) includes the high-side control transistor (10) and the low-side synchronous rectifying transistor (11) which are controlled to be on and off by external control signals, and a waveform with a given duty cycle is outputted at a node (LX) between the two transistors. The switch level circuit (110) also includes a control module for adjusting the dead time. The control module comprises a sampling circuit (16) for detecting the current dead time at the node (LX), an adjusting circuit (17) for buffering and converting the sampling voltage sampled by the sampling circuit (16), and a controlled delay unit (15) equipped with an external control input terminal, wherein the controlled delay unit (15) delays an external control signal and outputs the delayed signal to a controlled terminal of the low-side synchronous rectifying transistor (11) as a control signal. The switch level circuit (110) has simple structure, better performance and wide application range.

7 Claims, 7 Drawing Sheets

(56) References Cited

U.S. PATENT DOCUMENTS

| | | | |
|---|---|---|---|
| 8,085,024 B2 * | 12/2011 | Prodic et al. | 323/283 |
| 2008/0298101 A1 | 12/2008 | Kim et al. | |
| 2009/0001925 A1 | 1/2009 | Ohtani et al. | |
| 2010/0060254 A1 | 3/2010 | Tokura et al. | |

FOREIGN PATENT DOCUMENTS

| | | |
|---|---|---|
| CN | 101501976 A | 8/2009 |
| JP | 2007-151271 | 6/2007 |
| JP | 2007-329748 | 12/2007 |

* cited by examiner

US 8,659,345 B2

SWITCH LEVEL CIRCUIT WITH DEAD TIME SELF-ADAPTING CONTROL

CROSS-REFERENCE TO RELATED APPLICATION(S)

This application is a National Phase Patent Application of International Patent Application Number PCT/CN2010/078103, filed on Oct. 26, 2010, which claims priority to and the benefit of Chinese Patent Application Number 201010248404.4, filed on Aug. 6, 2010.

FIELD OF THE INVENTION

The present invention relates to a switch level circuit with self-adapting dead time control capability, in particular to a switch level circuit with self-adapting dead time control capability, which can reduce the switching loss in switching power supply converters with a synchronous rectifier, and improve the power supply conversion efficiency.

BACKGROUND OF THE INVENTION

In switching power supply converters, though a synchronous rectifier involves complex control, it can reduce switching loss. In switching power supply conversion circuits with a synchronous rectifier, one of the major factors that result in power loss is inappropriate dead time in the high-side control transistor and the low-side synchronous rectifying transistor.

FIG. 1 shows a typical step-down switching power supply conversion circuit 100 with a synchronous rectifier. The circuit 100 includes a power switch level, which has a high-side control power transistor 10 and a low-side synchronous rectifying transistor 11 that are coupled at the switching node. The switch level receives input DC voltage Vin, and provides controllable output DC voltage Vout at the output node. The circuit 100 has a modulator 12 that controls switching power supply conversion, a filtering network 13 connected in series with the switch level, a load 14 connected to the output node, and a delay unit 15 that provides dead time that is used to confirm connection to the switching node is LX, a gate signal Pg of the high-side control power transistor 10, and a gate signal Ng of the low-side synchronous rectifying transistor 11.

The high-side control transistor 10 and low-side synchronous rectifying transistor 11 usually employ the following modulation mode to control ON/OFF state: when the rectifying transistor 11 is in OFF state, the control transistor 10 is in ON state within a preset time; after the control transistor 10 is turned off, the rectifying transistor 11 enters into ON state. The control transistor 10 and rectifying transistor 11 must be controlled carefully so that they will never be in ON state at the same time, otherwise feed-through of current from the high-side transistor to the low-side transistor in the power stage will occur. Therefore, a certain dead time DT must be provided between gate-off/gate-on of the control transistor 10 and the rectifying transistor 11.

The dead time DT restricts the control transistor 10 and rectifying transistor 11 from gate-on at the same time, but it is subject to the influence of the filtering network. If the dead time is long, negative voltage will occur at the switching node LX, as shown in FIG. 2, which will result in gate-on of the body diode of rectifying transistor 11 and introduce loss; as shown in FIG. 3, if the dead time is short, the rectifying transistor 11 will be gated-on before the voltage value at the switching node LX drops to zero voltage, and therefore gate-on state current in positive direction will be produced in the rectifying transistor 11. Neither too long dead time nor too short dead time is advantageous for the power supply conversion efficiency. The optimal dead time is the sum of the gate-off time of power control transistor 10, turn on time of rectifying transistor 11, and discharge time Ta of parasitic capacitance at the node LX, recorded as optimal time $T_{opt}$.

In particular, in an application where the variation range of power supply conversion output load is wide or the size of power transistors 10 and 11 vary dynamically, the discharge time Ta of parasitic capacitance at the node LX varies severely, and thereby the optimal time $T_{opt}$ varies accordingly. A fixed dead time control method will cause extremely long or short dead time and therefore result in gate-on of the body diode of rectifying transistor 11 or gate-on of the low-side synchronous rectifying transistor in positive direction. A better design is to adjust the control dead time dynamically as the optimal time $T_{opt}$ varies, and thereby improves the conversion efficiency of the power supply.

SUMMARY OF THE INVENTION

An object of the present invention is to provide a switch level circuit with self-adapting dead time control capability, which has an optimized dead time, to reduce the gate-on time of the body diode of low-side synchronous rectifying transistor and the gate-on time in positive direction of the low-side synchronous rectifying transistor in switching power supply converter, so as to improve the conversion efficiency of the switching power supply unit. The further object of the present invention is to avoid factors that have influence on the dead time, such as specific detection circuit, self-adapting load, and size of power transistor, etc., so that the circuit can be applied in switching power supply conversion circuits in different control modes.

The present invention employs the following technical scheme:

The present invention comprises a power switching transistor and a synchronous rectifying transistor in a switching power supply converter; a sampling transistor connected to the switching node; a sampling capacitor that acquires sampling signals; charging current and discharging current designed to charge/discharge of the sampling capacitor; a regulating circuit designed to buffer, hold, and treat the sampling voltage; a holding capacitor designed to hold the acquired, buffered, and regulated sampling voltage; a converting circuit designed to convert the held capacitance voltage into a control signal of a delay unit; and, the delay unit, which provides a dead time and has adjustable control capability.

Specifically, the present invention detects the gate-on time of body diode of a low-side rectifying transistor in a switching power supply converter, reflects the gate-on time in the voltage value of a sampling capacitor, buffers and holds the sampling voltage, applies the sampling voltage on a delay unit with adjustable control capability, and thereby implements a self-adapting dead time.

ADVANTAGES AND BENEFICIAL EFFECTS OF THE INVENTION

The present invention can regulate the dead time dynamically, reduce or eliminate any feed-through loss in high-side transistor and low-side transistor of rectifier and power devices and gate-on loss in body diode, and implements an optimal dead time, so as to reduce power loss. The self-adapting dead time control circuit has advantages over existing ordinary dead time control circuits in many aspects:

1. Fast speed of self-adaption, the dead time can be regulated in the second operating cycle after a bad dead time is detected and can be adjusted to an optimal value after 3-4 cycles.
2. High self-adapting control accuracy: since the dead time is regulated by directly detecting the gate-on time of body diode instead of indirectly detecting the factors that have influence on optimal dead time, the circuit can operate at high accuracy in various working environments, regardless of the manufacturing technology.
3. The circuit has simple structure, very low power consumption, very small layout area, and very low control complexity, etc., and can achieve self-adapting dead time control at a low cost.
4. Wide applicability: the present invention detects the gate-on time of body diode of a synchronous rectifying transistor, and doesn't require any design adjust to the switching power supply converter with specific control mode; therefore, it is applicable to any switching converter with a synchronous rectifying transistor.

EMBODIMENTS

Figure 1:
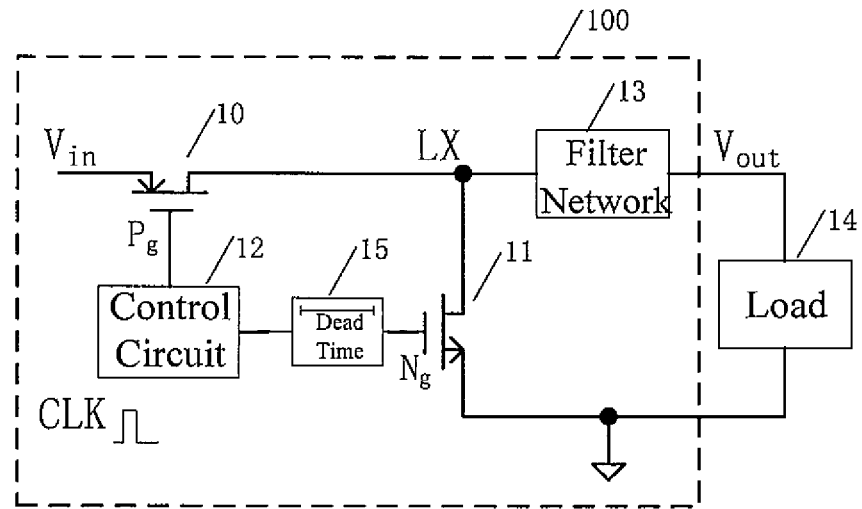
FIG. 1 is a structural diagram of the switch level circuit in a switching power supply converter with a synchronous rectifier.
Figure 2:
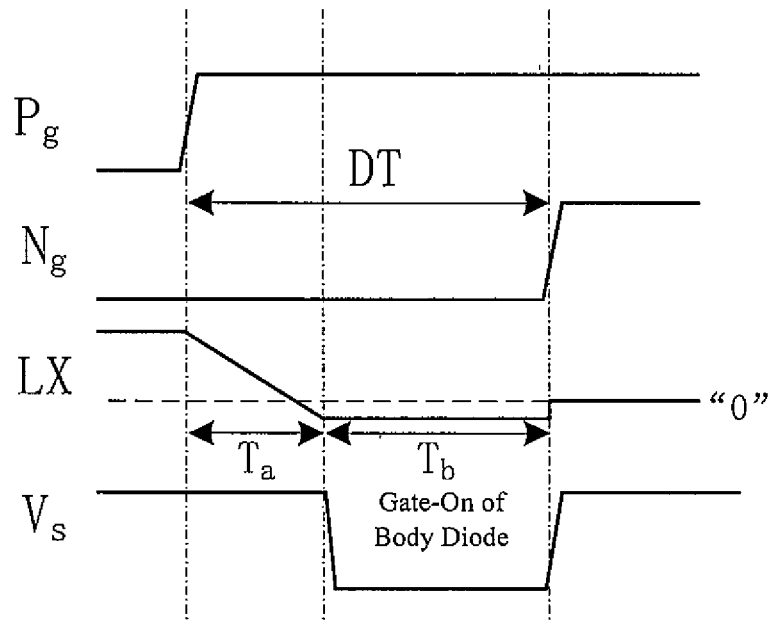
FIG. 2 shows the dead time control in the modulation process for the switch level MOS transistors shown in FIG. 1 and the signal waveform of negative LX node voltage as a result of gate-on of the body diode of low-side synchronous rectifying transistor due to extremely long dead time.

FIG. 1 shows a switch level circuit 100 with a synchronous rectifying NMOS transistor 11, the modulation signal controls a high-side PMOS transistor 10, and the signal is confirmed as Pg; at the same time the signal is delayed a certain time by the delay control circuit 15 and reaches to the low-side NMOS transistor, and the signal is confirmed as Ng. FIG. 2 shows the waveform of signal Pg and Ng. The high-side PMOS transistor and low-side NMOS transistor are connected to each other at the switching node LX.

FIG. 2 shows the waveform of voltage at the switching node LX, and the relation between the voltage and delay time of the signal Pg and Ng. Wherein, the time Ta represents the voltage falling time at the node LX, as decided jointly by the gate-off time of the high-side PMOS transistor, parasitic capacitance at the node LX, and output current; the time Tb represents the voltage value at the node LX is a negative PN junction voltage drop as a result of gate-on of the body diode of low-side NMOS transistor 11 due to an extremely long dead time.

Figure 3:
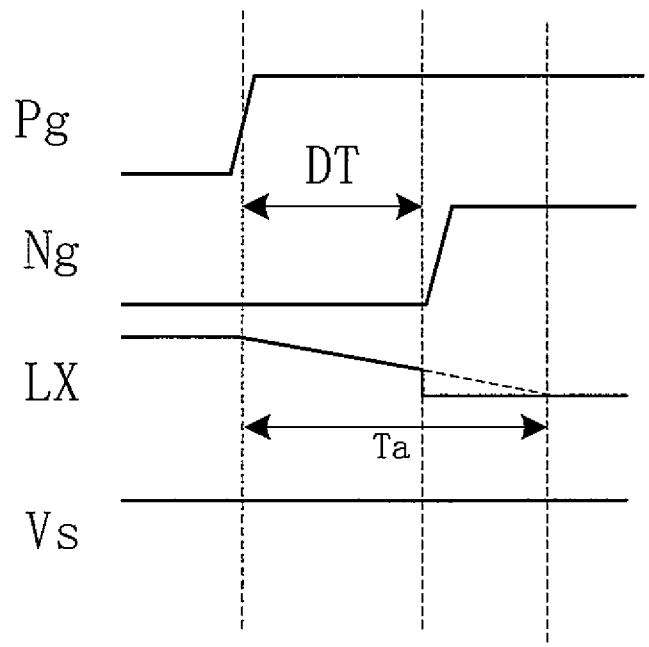
FIG. 3 shows the dead time control in the modulation process for the switch level MOS transistors shown in FIG. 1 and the signal waveform of sudden drop of LX node voltage as a result of current feed-through between the high-side power transistor and the low-side synchronous rectifying transistor due to extremely short dead time.

FIG. 3 shows gate-on of the low-side synchronous rectifying transistor in positive direction before the voltage at node LX drops to the low voltage due to extremely short dead time. For special applications such as applications of the output current varies severely, or the size of high-side/low-side MOS transistor Mp varies dynamically, or the working temperature varies, the $T_{opt}$ time varies with a certain range; if a fixed dead time is employed, the body diodes of MOS transistors in the switch level may gate-on, or the low-side synchronous rectifying transistor may gate-on in positive direction, causing increased gate-on loss in the switch level.

Figure 4:
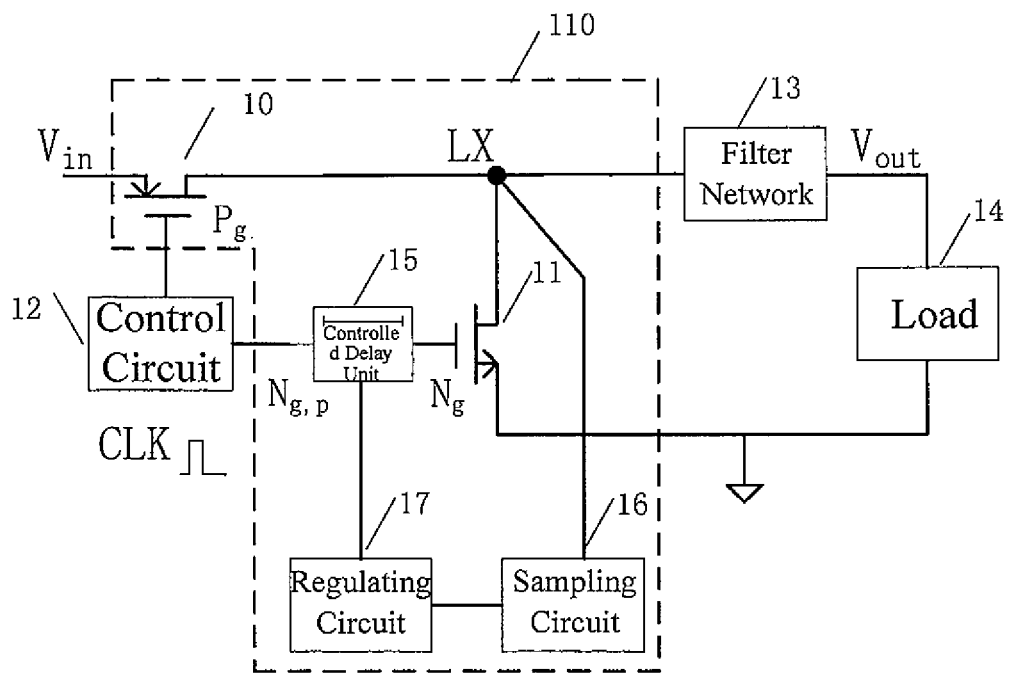
FIG. 4 is a schematic diagram of the present invention, which shows the circuit in the present invention changes the sampling voltage by detecting the occurrence time of negative voltage at the switching node LX via a sampling circuit and changes a controlled delay unit to produce an self-adapting dead time by means of the buffering and regulating of a regulating circuit.

FIG. 4 shows a schematic diagram of the switch level circuit 110 with self-adapting dead time control capability, wherein, the power level switch of a switching power supply unit is composed of a high-side control transistor 10 and a low-side rectifying transistor 11, and the switching node is LX; the control principle of self-adapting dead time is as follows:

Control the charging/discharging of the sampling capacitor by detecting the gate-on of the body diode of low-side synchronous rectifying transistor via a sampling circuit 16 connected to the switching node LX, buffer and regulate the voltage value of the sampling capacitor via a regulating circuit 17, hold the buffered voltage signal in a holding capacitor, and decide the next operating cycle dead time for a delay unit 15 with adjustable control capability according to the voltage value, so as to achieve self-adapting regulation of the dead time.

Figure 5:
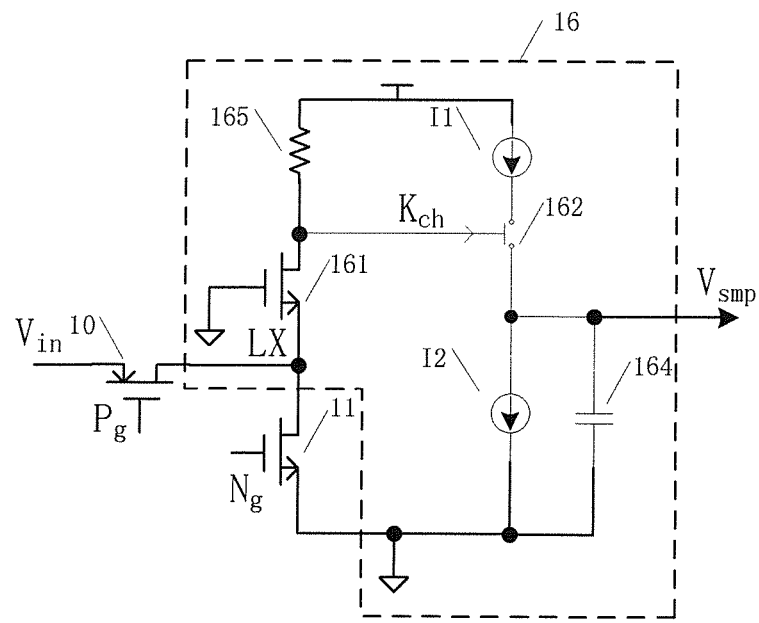
FIG. 5 is a schematic diagram of the sampling circuit connected to the switching node LX.

FIG. 5 shows the schematic diagram and connection relation of the sampling circuit 16. As shown in this Figure, the source electrode of a sampling transistor 161 is connected to said node LX, the gate electrode of the sampling transistor 161 is grounded, and the drain electrode of the sampling transistor 161 is connected to the load and is used as the sampled output signal. When a negative voltage occurs at the node LX, the body diode of rectifying transistor 11 gates-on, and the sampling transistor 161 gates-on and causes the signal $K_{ch}$ to decrease, so that the switch 162 gates-on, and the sampling capacitor 164 is charged, at charging current I1. The current drain I2 in the figure is a discharging circuit, and it is controlled to gate-on for a fixed time in each operating cycle of the switching power supply unit, so as to release the fixed charges from the sampling capacitor.

Figure 6:
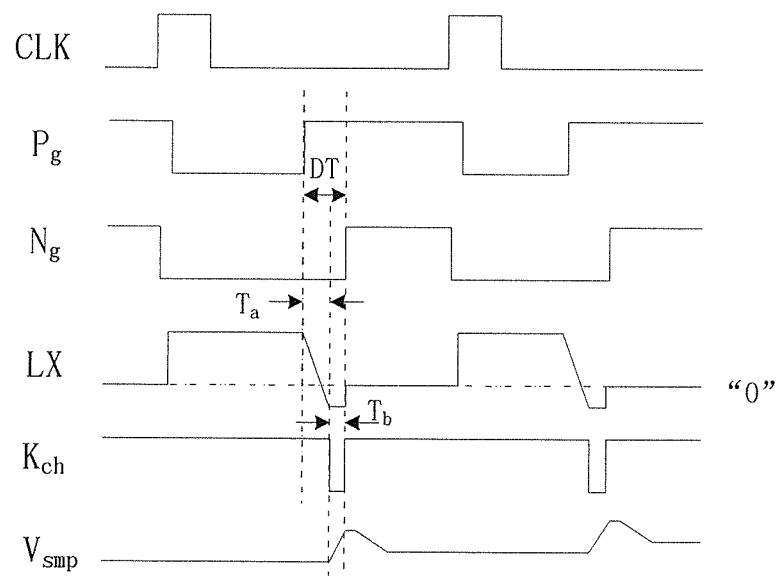
FIG. 6 is a timing sequence diagram of working of the sampling circuit in a switching cycle of the switching power supply unit.

FIG. 6 shows a timing sequence diagram of the sampling circuit 16. The dead time is set to a high value to prevent forward current in the low-side synchronous rectifying transistor during normal operating cycles of the switching power supply unit; therefore, a negative voltage will occur at the node LX and sustain for a time Tb after the control transistor 10 turns off and before the rectifying transistor 11 turns on, because the body diode of rectifying transistor 11 gates-on, and at that time the switch 162 gates-on, and the sampling transistor 164 is charged; after the charging is completed, the control switch 162 gates-off, and the sampling capacitor 164 discharges through the current drain I2 by a discharge quantity $Q_{dch}$. After a operating cycle, the variation quantity of voltage of the sampling capacitor voltage value $V_{smp}$ is:

$$\Delta V_{smp} = \frac{I_{ch} \cdot T_b - Q_{dch}}{C_{smp}} = A \cdot \Delta T_b$$

Wherein, A is a sampling coefficient, which is related with the capacitance value of the sampling capacitor and the charging/discharging current of the sampling circuit. FIG. 6 shows the variation of the voltage value $V_{smp}$ of the sampling capacitor.

Figure 7:
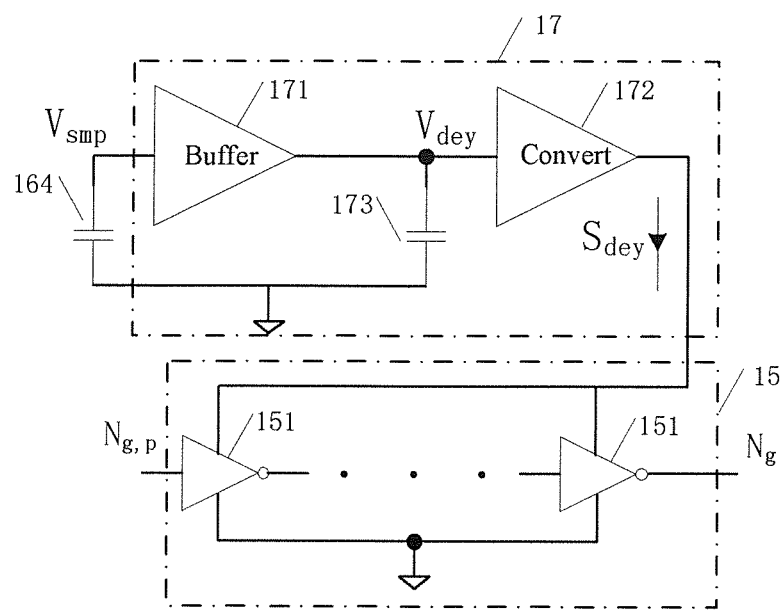
FIG. 7 is a schematic diagram of the regulating circuit that buffers and regulates the sampling voltage and the controlled delay unit.
Figure 8:
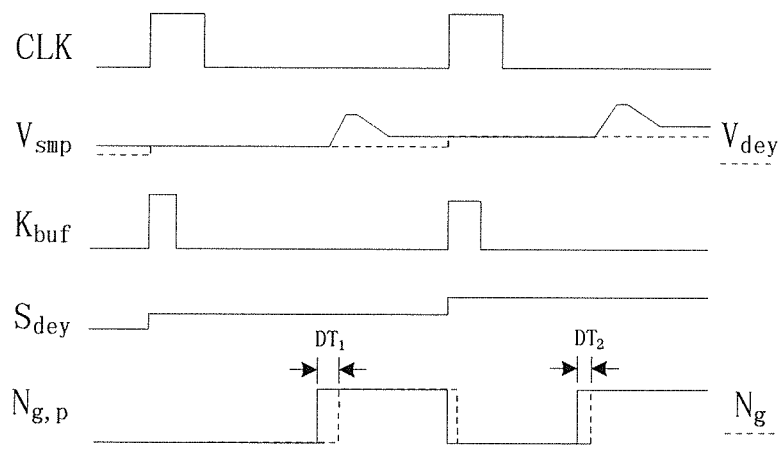
FIG. 8 is a timing sequence diagram of the regulating circuit and controlled delay unit in a switching cycle of the switching power supply unit.

FIG. 7 shows a schematic diagram and connection relation of the regulating circuit 17 and the control delay unit 15. The voltage value of the sampling capacitor 164 is duplicated by a buffer 171 and held by a holding capacitor 173; as shown in FIG. 8, and the signal of voltage value of the holding capacitor is recorded as $V_{dey}$. The buffer 17 further comprises a regulating converter 172, which converts the voltage value $V_{dey}$ into a delay time signal $S_{dey}$ of the control delay unit. Here, the conversion ratio is set as follows:

$$\Delta S_{dey} = B \cdot \Delta V_{dey} = A \cdot B \cdot \Delta T_b$$

Wherein, B is a conversion coefficient. FIG. 7 shows a typical current control delay unit 15, the delay unit is charged under the control of the control signal $S_{dey}$ generated by the regulating circuit 17, and the delay time between output signal and input signal of the delay unit depends on the charging signal value, generally:

$$DT = \frac{C}{S_{dey}}$$

Wherein, C is a delay coefficient, the delay time DT is inversely proportional to the control signal, and the change of dead time as a result of the change of control signal $S_{dey}$ is:

$$\Delta DT = \frac{C}{S_{dey} + \Delta S_{dey}} - \frac{C}{S_{dey}} = -\frac{C \cdot \Delta S_{dey}}{S_{dey}(S_{dey} + \Delta S_{dey})}$$

Since $S_{dey} \gg \Delta S_{dey}$ and $S_{dey}$ can be considered as a fixed value in some operating cycles, the relation between the change of dead time and the change of control signal $S_{dey}$ is approximately as:

$$\Delta DT = -C' \cdot \Delta S_{dey}$$

Wherein, C' is approximately a constant. FIG. 8 shows the delay time produced by the delay unit is decreased from $DT_1$ to $DT_2$ as the charging current increases, i.e., the charging current is inversely proportional to the dead time in the next operating cycle.

To sum up, after the gate-on time of the body diode in the switching power supply converter is changed by $\Delta Tb$ due to some reasons, the voltage on the sampling capacitor will change, and, under the control of the self-adapting dead time, the dead time in the next operating cycle will change:

$$\Delta DT = -ABC' \cdot \Delta T_b$$

The dead time can be regulated in a self-adapting manner according to the operating condition of the power supply converter by adjusting the product of the coefficients A, B, and C' to an appropriate value. Typically, the product of A, B, and C' can be set to ½, i.e., after the gate-on time of the body diode is changed by $\Delta Tb$, the dead time in the next operating cycle will be decreased by $-\frac{1}{2}\Delta Tb$ accordingly; after 3 or 4 operating cycles, the dead time DT will get close to the optimal time $T_{opt}$ gradually.

EMBODIMENTS

Figure 9:
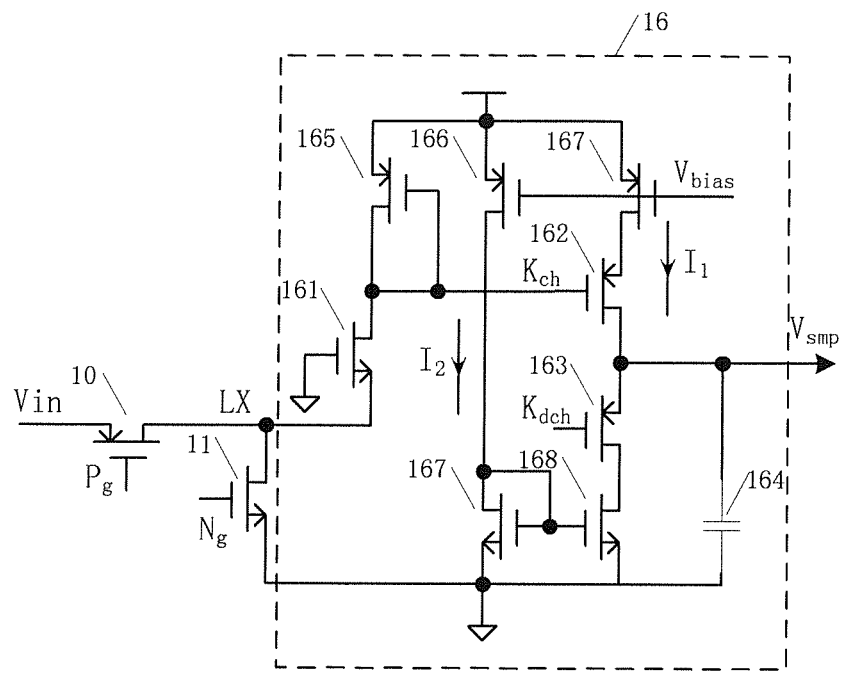
FIG. 9 shows an embodiment of the sampling circuit.

FIG. 9 shows one embodiment of self-adapting dead time control, and the sampling circuit employs the structure shown in the box 16 enclosed by dotted lines. Wherein, an NMOS transistor 161, with the gate electrode grounded and the source electrode connected to the node LX, is used as a sampling transistor; a PMOS transistor 165, with the drain end connected to the diode, is used as the load for the sampling transistor; the gate electrodes of PMOS transistors 166 and 167 are connected to a bias voltage $V_{bias}$ at a fixed potential, the drain current of the PMOS transistor 167 is used as a charging current source for sampling, and after the drain current of the PMOS transistor 166 passes through NMOS current mirror then provides a discharging current source for sampling; a switching transistor 162 is used as a charging switch, when the sampling transistor 161 gates-on as a result of a negative voltage occurs at the switching node LX, the enabling signal $K_{ch}$ of the sampling charging switch 162 becomes valid, and thereby the sampling capacitor 164 is charged; after the charging is completed, the enabling signal $K_{dch}$ of the switching transistor 163 remains valid for a fixed time; during that time, the discharging circuit discharges the sampling capacitor 164 by a fixed charge amount per operating cycle via the discharging current source I2; one end of the sampling capacitor 164 is grounded, and the other end is connected to the connecting node between the switch 162 and the switch 163.

Figure 10:
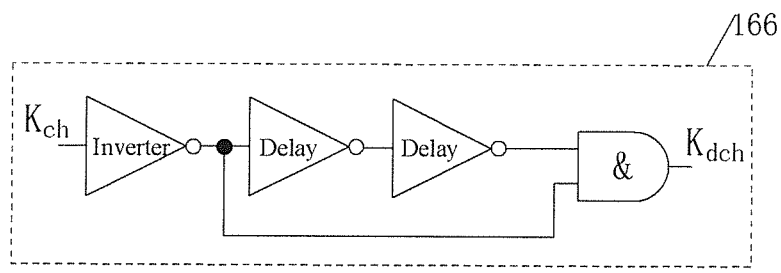
FIG. 10 shows an embodiment of the sampling circuit that generates a $K_{dch}$ signal.

FIG. 10 shows one embodiment of generation of enabling signal for the discharging switch transistor 163, wherein, the enabling signal $K_{ch}$ of the sampling charging switch 162 passes through a pulse-generating circuit, and causes the $K_{dch}$ signal to become valid and remain valid for a duration equal to two times of the delay time of the delay unit.

Figure 11:
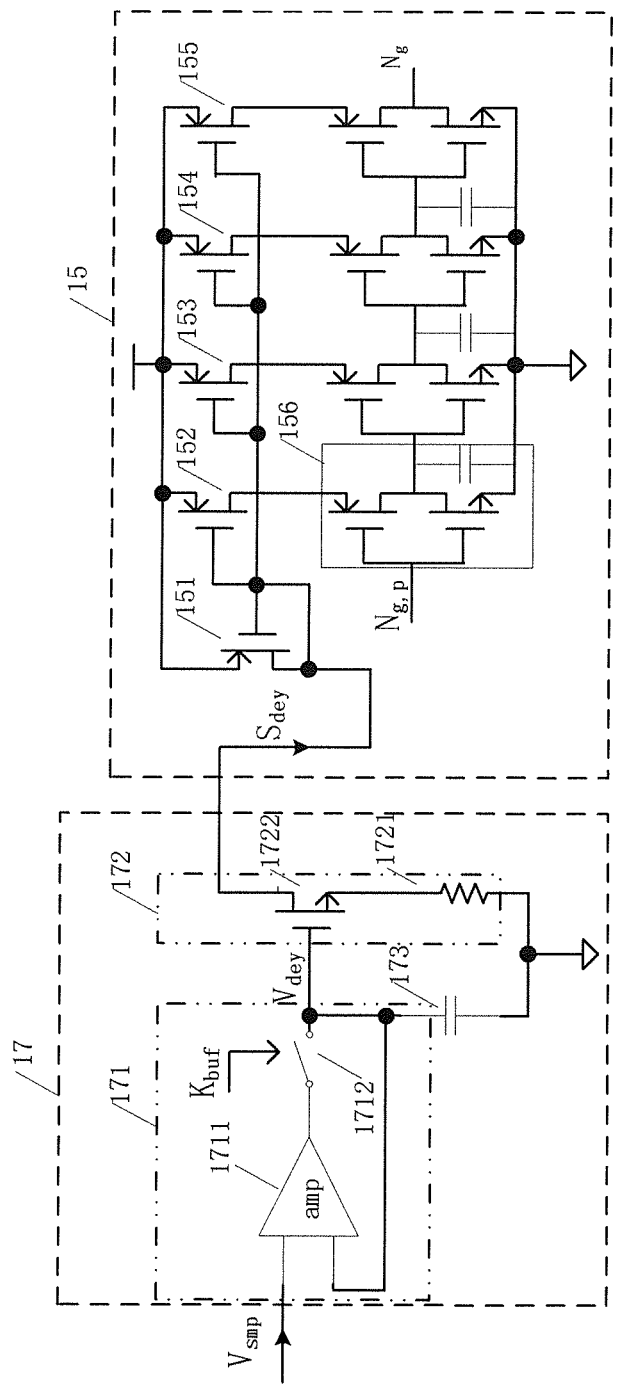
FIG. 11 shows an embodiment of the regulating circuit and controlled delay unit.

The circuit in the box 17 enclosed by dotted lines in FIG. 11 is the regulating circuit. Wherein, the amplifier 1711 is connected to form a unit gain buffer, which holds the voltage value $V_{smp}$ of the sampling capacitor 164 on the capacitor 173; the switch 1712 is controlled by an external signal $K_{buf}$, when the switch 1712 turns on, the holding capacitor 173 updates the sampling information, when the switch 1712 turns off, the voltage value on the holding capacitor 173 remains unchanged; the regulating circuit 172 employs a common source amplifier composed of a resistor 1721 and an NMOS transistor 1722, with negative feedback from the source electrode, to convert the voltage value $V_{dey}$ on the holding capacitor 173 into delay current $S_{dey}$ for a current controlled delay unit 15.

FIG. 11 shows an embodiment of the controlled delay unit, wherein, an inverter delay chain 156 is used as the delay path, the input signal is the second external control signal $N_{g,p}$, and the output is the control signal $N_g$ of the synchronous rectifying transistor 11. The gate electrodes of PMOS transistors 152~155 are connected to the drain electrode of PMOS transistor 151 to form a current mirror; the source electrodes of PMOS transistors 152~155 are connected to the power supply, and the drain electrodes of the PMOS transistors 152~155 are used as the charging current end for the inverter delay chain; the input current of the current mirror is the output signal from the regulating circuit part, and the current mirror duplicates the delay current $I_{dey}$ as the charging current for the inverter delay chain, so as to control the delay time of the delay unit.

Figure 12:
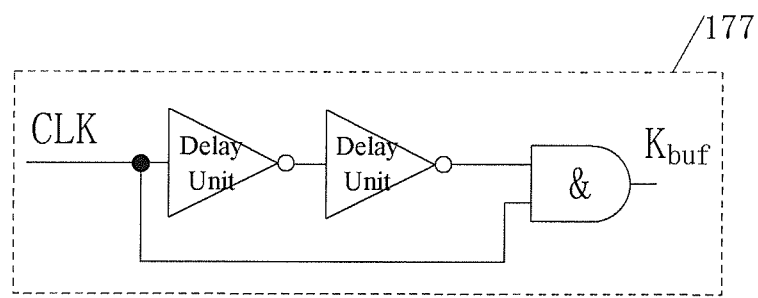
FIG. 12 shows an embodiment of the regulating circuit that generates a $K_{buf}$ signal.

FIG. 12 shows a circuit that generates the buffering switch signal $K_{buf}$, wherein, the clock signal CLK passes through a pulse-generating circuit and generates the buffering switch signal $K_{buf}$ for controlling the duplicated sampling voltage on the holding capacitor in the regulating circuit.

Figure 13:
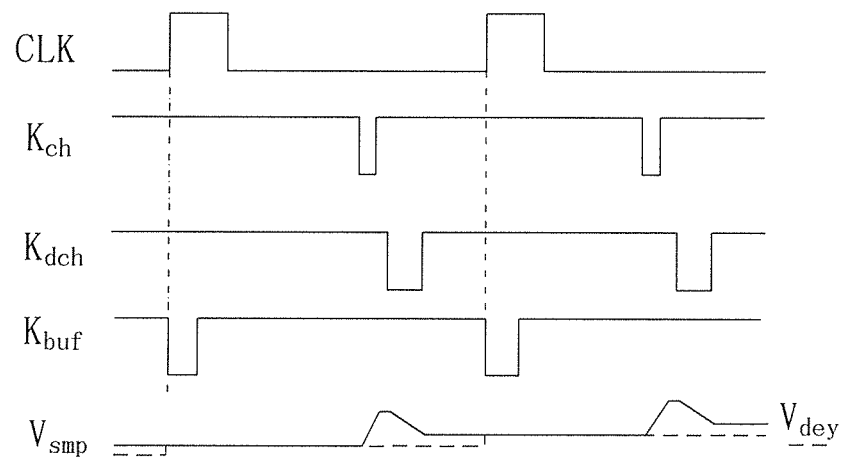
FIG. 13 is a detailed implementation timing sequence diagram of the above embodiments.

FIG. 13 shows the timing sequence diagram of charging switch signal $K_{ch}$, discharging switch signal $K_{dch}$, and buffering switch signal $K_{buf}$, and a voltage timing sequence diagram of the sampling capacitor 164 and holding capacitor 173.

The product of the coefficients A, B, and C' can be implemented to ½ by adjusting the parameters in the circuit, such as capacitance and voltage/current conversion coefficient, etc.; thus, the dead time will be regulated with the gate-on time of body diode of the rectifying transistor accordingly, so that a preset gate-on time of body diode can be kept, self-adapting dead time control can be achieved, and the switching loss in the switching power supply converter can be reduced greatly.

While the present invention has been described and illustrated with reference to some preferred embodiments, but the present invention is not limited to these. Those skilled in the art should recognize that various variations and modifications can be made without departing from the spirit and scope of the present invention as defined by the accompanying claims.

The invention claimed is:

1. A switch level circuit with self-adapting dead time control capability comprising:
    a high-side control transistor (10) and a low-side synchronous rectifying transistor (11) having,
        a source end of the high-side control transistor (10) connected to an input voltage, and a source end of the low-side synchronous rectifying transistor (11) being grounded,
        a drain end of the high-side control transistor (10) connected to a drain end of the low-side synchronous rectifying transistor (11) to form a switching node (LX), and
        a gate end of the high-side control transistor (10) used as a controlled end of the high-side control transistor (10), configured for inputting a first external control signal (Pg), and a gate end of the low-side synchronous rectifying transistor (11) configured as a controlled end of the low-side synchronous rectifying transistor (11) to control ON/OFF of the high-side control transistor (10) and the low-side synchronous rectifying transistor (11), so as to produce a waveform with a controllable duty ratio at the switching node (LX), and produce an output voltage on a load (14) through an external filtering network (13); and
    a control module configured to regulate dead time between the high-side control transistor (10) and the low-side synchronous rectifying transistor (11), the control module comprising:
        a sampling circuit (16) configured to detect a current dead time by collecting a sampling voltage at the switching node (LX),
        a regulating circuit (17) configured to buffer and convert the sampling voltage collected by the sampling circuit (16), and
        a controlled delay unit (15) with an external control input end configured to delay a second external control signal ($N_{g,p}$) and takes the delayed second external control signal as a control signal ($N_g$) for the controlled end of the low-side synchronous rectifying transistor (11).

2. The switch level circuit with self-adapting dead time control capability according to claim 1, wherein the sampling circuit (16) comprises:
    a sampling transistor (161);
    a sampling output load (165);
    a sampling charging switch (162);
    a sampling charging current source (I1);
    a sampling discharging current source (I2); and
    a sampling capacitor (164),
    wherein, a gate end of the sampling transistor (161) is grounded, a source end of the sampling transistor (161) is connected to said switching node (LX), a drain end of the sampling transistor (161) is connected to a sampling output load (165) and used as an output of the sampling transistor (161) and connected to an enabling end of the sampling charging switch (162); when a negative voltage occurs at the switching node (LX) as a result of extremely long dead time, the drain end of the sampling transistor (161) outputs a sampled signal to turn on the sampling charging switch (162); the sampling charging switch (162) is connected between the sampling charging current source (I1) and one end of the sampling capacitor (164) to charge the sampling capacitor (164), and an other end of the sampling capacitor (164) is grounded; at a same time, one end of the sampling capacitor (164) is connected to the sampling discharging current source (I2) to discharge the sampling capacitor (164) by a fixed charge amount per operating cycle, one end of the sampling capacitor (164) is also used as an output end of sampled signal ($V_{smp}$) for the sampling circuit (16).

3. The switch level circuit with self-adapting dead time control capability according to claim 2, wherein the regulating circuit (17) comprises:
    a buffer circuit (171);
    a holding capacitor (173); and
    a converting circuit (172);
    wherein,
    an input end of the buffer circuit (171) is connected to the output end of sampled signal ($V_{smp}$) of the sampling circuit (16), and an output end of the buffer circuit (171) is connected to one end of the holding capacitor (173) to hold a buffered sampled signal ($V_{smp}$) on the holding capacitor (173) and generate a sample holding signal ($V_{dey}$), and an other end of the holding capacitor (173) is grounded; an input end of the converting circuit (172) is connected to one end of the holding capacitor (173) to amplify the sample holding signal ($V_{dey}$) and process the sample holding signal ($V_{dey}$) by current-voltage conversion or A/D conversion, an output end of the converting circuit (172) is used as an output end of the regulating circuit (17) to output a regulated delay control signal ($S_{dey}$) and control a dead zone delay time in a next switching cycle of a power stage.

4. The switch level circuit with self-adapting dead time control capability according to claim 3, wherein, an input end of the controlled delay circuit (15) is used for an input of the second external control signal ($N_{g,p}$), an output end of the controlled delay circuit (15) is connected to the controlled end of the low-side synchronous rectifying transistor (11) to provide the control signal ($N_g$), the external control input end of the controlled delay circuit (15) is connected to the output end of the regulating circuit (17).

5. The switch level circuit with self-adapting dead time control capability according to claim 2, wherein, said sampling transistor (161) employs a NMOS sampling transistor, with a gate end grounded and a source end connected to the switching node (LX); said sampling output load (165) employs a PMOS transistor connected in a diode manner and connected to a drain end of the NMOS sampling transistor (161); the drain end of the NMOS sampling transistor (161) is also used as a sampling output to control an enabling signal ($K_{ch}$) for the charging switch (163); the sampling charging current source (I1) and the sampling discharging current source (I2) are generated by an external bias voltage ($V_{bias}$), the external bias voltage ($V_{bias}$) is connected to gate ends of PMOS transistors (167, 166), and source ends of the PMOS transistors (167, 166) are connected to a power supply, a drain current from the PMOS transistor (167) is used as the sampling charging current source (I1), a drain end of the PMOS transistor (166) is connected to a current mirror composed of NMOS transistors (167, 168), the current mirror duplicates a drain current from the PMOS transistor (166), and an output current of the current mirror is used as the sampling discharging current source (I2); the sampling capacitor (164) discharges by a fixed charge amount per operating cycle, an NMOS switching transistor is added as a discharging switch (163) between the sampling discharging current source (I2) and the sampling capacitor (164), and a pulse-generating circuit (166) composed of a delay unit and NAND gates is used as an enabling generation circuit for the discharging switch (163); after the charge enabling signal ($K_{ch}$) is turned off, the pulse-generating circuit (166) generates a pulse signal ($K_{dch}$) that lasts for a fixed time, to control the discharging switch (163) to discharge the sampling capacitor by a fixed charge amount.

6. The switch level circuit with self-adapting dead time control capability according to claim 3, wherein, the buffer circuit (171) comprises an amplifier (1711) and a holding switch transistor (1712), a positive end of said amplifier (1711) is used as the input end of the buffer circuit (171), a negative end of said amplifier (1711) is connected to the output end of the buffer circuit (171), one end of the holding switch transistor (1712) is connected to an output end of the amplifier (1711), and an other end of the holding switch transistor (1712) is used as the output end of the buffer circuit (171), a controlled end of the holding switch transistor (1712) receives an enabling signal ($K_{buf}$) to control holding/updating of a voltage value on the holding capacitor (173), the enabling signal ($K_{buf}$) is generated by a pulse-generating circuit (177), and the pulse-generating circuit (177) is composed of a delay unit and NAND gates, and an input end of the pulse-generating circuit is connected to an external clock; the converting circuit (172) is in a common source amplifier structure with negative feedback from a source electrode, which is composed of a NMOS transistor (1721) and a resistor (1722), a gate end of the NMOS transistor (1721) is used as the input end of the converting circuit (172) and connected to the holding capacitor (173), the resistor (1722) is connected between a source end of the NMOS transistor (1721) and ground, and a drain end of the NMOS transistor (1721) is used as the output end of the converting circuit (172) to output a signal ($S_{dev}$).

7. The switch level circuit with self-adapting dead time control capability according to claim 3, wherein, said controlled delay circuit (15) is in a structure of inverter delay chain (156) that allows for variable charging current, and an input end of the inverter delay chain (156) receives the second external control signal ($N_{gp}$), and an output end of the inverter delay chain (156) generates the control signal ($N_g$) for the low-side synchronous rectifying transistor (11), a controlled delay of the inverter delay chain (156) employs a current mirror structure composed of PMOS transistors (151~155), a gate end of the PMOS transistor (151) is connected to a drain end, is used as an input end of the current mirror to receive an output signal ($S_{dev}$) from the buffer circuit (17), the gate ends of the PMOS transistors (152~155) are connected to the gate end of the PMOS transistor (151), the drain ends of the PMOS transistors (152~155) are used as an output end of the current mirror, and are connected to a source end of a high-side PMOS transistor in the inverter delay chain (156), a delay time of the inverter delay chain (156) is decided by an output current value of the current mirror.

* * * * *